United States Patent [19]

Robertiello et al.

[11] 4,273,659

[45] Jun. 16, 1981

[54] REMOVING POTASSIUM SALTS FROM DISTILLER'S WASH

[75] Inventors: Andrea Robertiello; Ludwig Degen, both of Rome, Italy

[73] Assignee: E.N.I. Ente Nazionale Idrocarburi, Rome, Italy

[21] Appl. No.: 74,742

[22] Filed: Sep. 12, 1979

[30] Foreign Application Priority Data

Sep. 19, 1978 [IT] Italy ............................ 27827 A/78

[51] Int. Cl.³ .............................................. C02F 1/54
[52] U.S. Cl. .................................. 210/728; 210/902; 426/624; 426/635; 426/807
[58] Field of Search ................... 71/26; 210/42 R, 45, 210/47, 49, 51–54, 56; 426/53, 624, 635, 807; 210/702, 710, 712, 723–729, 737, 738

[56] References Cited

U.S. PATENT DOCUMENTS

| | | | |
|---|---|---|---|
| 2,332,823 | 10/1943 | Wintzell et al. | 210/42 R |
| 3,983,255 | 9/1976 | Bass | 426/635 |
| 4,069,033 | 1/1978 | Baldassari | 210/51 |

FOREIGN PATENT DOCUMENTS

| | | | |
|---|---|---|---|
| 215442 | 10/1956 | Australia | 426/807 |
| 50-15707 | 6/1975 | Japan | 426/635 |
| 326165 | 3/1972 | U.S.S.R. | 71/26 |

*Primary Examiner*—Peter A. Hruskoci
*Attorney, Agent, or Firm*—Morgan, Finnegan, Pine, Foley & Lee

[57] ABSTRACT

For removing potassium salts from distiller's wash, an acid the potassium salts of which are poorly soluble and an organic solvent are added to the wash, whereafter the precipitated salts are collected on a filter and the solvent is recovered by distillation.

2 Claims, No Drawings

REMOVING POTASSIUM SALTS FROM DISTILLER'S WASH

This invention relates to a process for removing potassium salts from the distillers' washes and to the products thus recovered. More particularly, this invention relates to a process for the selective precipitation of potassium salts from the distillers' washes coming from the distillation of beet molasses for producing ethanol.

Such residues are commonly called "distillers' wash".

The production of distillers' wash from beet molasses (referred to the product containing 65% of dry matter) in the year 1978 in Western Europe has been 680,000 metric tons. Such a huge quantity of organic substances has originated and still gives rise to important problems of disposal inasmuch as the methods proposed hitherto for disposal or exploitation of the distillers' wash do not appear to have provided an ideal approach.

Distillers' wash from beet molasses can be used as food integration ingredients for ruminants, but only to an amount of 10% maximum, and for swine fodder to a maximum of 3%. These limitations derive mainly from the high content of potassium ion (which is nearly 10% of the dry matter) and the consequent unbalance in the ratio between the concentration of the potassium ion with respect to the sodium ion, which, in fodders, must be nearly 1 whereas in the distillers' wash from beet molasses this ratio is about 2.5.

Another limitation in the use for fodder of the by-products in question is the high ash content which is nearly 39% of the dry matter.

To overcome these drawbacks, various procedures have been suggested in the past, such as, for example, the partial removal of potassium by treatment with ammonium sulphate in the progress of a process of saturation, precipitation and neutralization, which is being exploited in a few European countries.

Such a process, in addition to being expensive, deeply modifies the original composition of the distillers' wash and increases enormously the concentration of the ammonium ion up to a value of 8.4% of the dry matter.

The present invention has for its object to provide a process for the separation of the potassium ion by virtue of the addition of an acid the potassium salts of which are poorly soluble, and the addition of an organic solvent, the presence of which depresses the solubility of these salts further.

Under these conditions, the precipitation of the potassium ion takes place and, concurrently, the partial precipitation of the other cations which are present, these latter also in the form of salts of the acid concerned, and these salts can be separated by merely decanting or filtering off same.

In this potassium-ion removal process inorganic acids can be used, such as sulphuric, nitric, hydrochloric, chloric, perchloric, iodic and chromic acids, or organic acids such as tartaric and oxalic acids.

For the process according to the present invention, it is preferred to use, among the inorganic acids, the sulphuric, nitric and hydrochloric acids, and, among the organic acids, tartaric acid is preferred.

As the organic solvents, there can be used aliphatic alcohols, ethanol being preferred, with propanol and isopropanol, or ketones such as acetone or methylethylketone, for example, or also volatile esters such as, for example, methyl acetate and ethyl acetate.

An interesting aspect of the present invention as compared with the prior art, is the possibility of recovering the solvent in its entirety, after the salts have been removed, by a simple distillation step.

An additional advantage of the process according to the present invention is that the composition of the distillers' wash is nearly identical to the initial chemical composition, with the exception of the drastic reduction of the content of potassium ion and of the overall ash content.

A further improvement over the conventional methods of removal of the potassium ion, achieved by the process of this invention, is that it is no longer required to concentrate the distillers' wash from beet molasses considerably in order that the precipitation process may be satisfactorily completed.

The end product which is obtained by the process according to the present invention, as has been ascertained, possesses all the properties which are a prerequisite for a satisfactory integrator to be used in the fodder industry.

The operational details will become more clearly apparent from the scrutiny of the following examples which are reported for illustration only and which are not to be construed as limitations of the scope of the invention.

EXAMPLE 1

A reactor equipped with a stirrer and which contains 120 mls of distillers' wash from beet molasses having 32% of dissolved matters, is charged with 4 mls. of conc. $H_2SO_4$ (density 1.8 g/ml) and, after a few minutes, with 20 mls acetone.

The as-obtained precipitate is collected on a filter, dried to constant weight in a vacuum oven at 40° C. and weighed.

There are obtained 14.53 g of raw salts which contained 61% of $K_2SO_4$ and 12% of $Na_2SO_4$. The initial concentration of the ion $K^+$ in the distillers' wash was 3.48% and the final concentration was 0.89%: for the ion $Na^+$, the initial concentration was 1.37% whereas the final concentration was 0.5%. In sum, the final ratio $K^+/Na^+$ is about 1.5.

Upon precipitation and separation of the salts, acetone was recovered by distillation.

EXAMPLE 2

A reactor equipped with stirrer and containing 120 mls of beet molasses' distillers' wash with 21% of dissolved solids, was charged with 8 mls of conc. $H_2SO_4$ (density 1.8 g/ml) and, after a few minutes' stirring, with 80 mls of ethanol.

The as-obtained precipitate was collected on a filter, dried to constant weight in a vacuum oven at 40° C. and weighed.

There were obtained 8.56 g of raw salts having a composition very close to that reported in EXAMPLE 1.

Upon precipitation and separation of the salts, the alcohol was recovered by distillation.

EXAMPLE 3

A reactor equipped with stirrer and containing 120 mls of beet molasses' distillers' wash having 32% of dissolved solids, was charged with 8 g of tartaric acid and, after stirring for a few minutes, with 20 mls of acetone.

The as-obtained precipitate was collected on a filter, dried to constant weight in a vacuum oven at 40° C. and weighed.

There were obtained 16.3 g of raw salts the contents of potassium and sodium were comparable with those obtained for the precipitate obtained as described in EXAMPLE 1.

Upon precipitation and separation of the salts, acetone was integrally recovered by distillation.

We claim:

1. A process for the removal of potassium ions from distillers' wash which is a waste product from the distillation of beet molasses consisting essentially of: adding to said distillers' wash an acid the potassium salts of which are poorly soluble, said acid is selected from the group consisting of sulphuric, nitric, hydrochloric, perchloric, iodic, chromic, tartaric and oxalic acids, and an organic solvent selected from the group consisting of aliphatic alcohols, the ketones, and the volatile esters, in quantities sufficient to cause said potassium ions to precipitate as potassium salts; separating out the precipitated salts from the solvent and the distillers' wash; and recovering said organic solvent from the distiller's wash by distillation.

2. The process of claim 1, wherein said acid is selected from the group consisting of sulphuric, nitric, hydrochloric and tartaric acids.

* * * * *